Patented July 4, 1950

2,513,504

UNITED STATES PATENT OFFICE 2,513,504

ESTERS

Samuel B. McFarlane, Summit, N. J., and John Lomartire, Cumberland, Md., assignors to Celanese Corporation of America, a corporation of Delaware No Drawing. Application June 28, 1947, Serial No. 757,930

8 Claims. (Cl. 260—476)

This invention relates to an improved process for the production of chlorobutyl esters of organic acids.

An object of this invention is the provision of an economical and efficient process for the production of the chlorobutyl esters of organic acids by the catalytic reaction of said organic acids with tetrahydrofuran.

Other objects of this invention will appear from the following detailed description.

We have found that the chlorobutyl esters of organic acids may be obtained in high purity and yield by adding phosphorus trichloride to a mixture of tetrahydrofuran and an organic acid, containing zinc chloride as catalyst, and then refluxing the resulting reaction mixture until reaction is completed. The reaction, which comprises the opening of the tetrahydrofuran ring followed by ester formation, proceeds smoothly and efficiently, with the chlorobutyl ester of the organic acid employed being formed in high purity and yield.

The organic acids employed may be aliphatic or aromatic acids. As examples of organic acids which may be employed in our novel reaction for the production of chlorobutyl esters, there may be mentioned acetic acid, propionic acid, acrylic acid, crotonic acid, butyric acid, isobutyric acid, valeric acid, caproic acid, heptoic acid, caprylic acid, capric acid, lauric acid, malonic acid, succinic acid, adipic acid, benzoic acid, hexahydrobenzoic acid, phthalic acid, phenyl acetic acid and toluic acid.

Usually, the reaction mixture employed comprises from 1 to 2 mols of the organic acid for each mol of tetrahydrofuran present and may contain from 0.0001 to 0.001 mol of zinc chloride. From 0.3 to 0.75 mols of phosphorus trichloride are usually added to the reaction mixture at the start of the reaction. The addition of the phosphorus trichloride is preferably made while the reaction mixture is at a temperature of 10 to 30° C. When the addition of the phosphorus trichloride is complete, the reaction mixture is gradually raised to reflux temperature and refluxing is continued until the desired esterification reaction has taken place. The chlorobutyl esters formed may then be separated from the reaction mass by fractional distillation, fractional precipitation or any combination of purification processes, as is well known in the chemical art.

In order further to illustrate our invention but without being limited thereto, the following example is given:

Example 72 parts by weight of tetrahydrofuran, 120 parts by weight of glacial acetic acid and about 0.014 part by weight of zinc chloride are placed in a reaction vessel provided with a condenser, cooled to 10° C. and, while agitating, about 6.5 parts by weight of phosphorus trichloride are slowly added thereto. The resulting mixture is then heated and refluxed for about 2 hours, the temperature gradually rising from about 66° C. to about 120° C. At the completion of the reaction, the product obtained is cooled and then poured into about 200 parts by weight of water. The ester which forms, namely, chlorobutyl acetate,

separates out as a water-insoluble layer. The ester, after it is washed free of acid and purified by fractional distillation, is a water-white liquid with a specific gravity of 1.080 at 20°/4 and boiling at about 193.2° C. A yield of about 80% of theoretical is obtained.

It is to be understood that the foregoing detailed description is given merely by way of illustration and that many variations may be made therein without departing from the spirit of our invention.

Having described our invention, what we desire to secure by Letters Patent is:

1. Process for the production of chlorobutyl esters of carboxylic acids, which comprises reacting a mixture of a carboxylic acid, phosphorus trichloride and tetrahydrofuran in the presence of zinc chloride as catalyst.

2. Process for the production of chlorobutyl esters of carboxylic acids, which comprises reacting a mixture of an aliphatic carboxylic acid, phosphorus trichloride and tetrahydrofuran in the presence of zinc chloride as catalyst.

3. Process for the production of chlorobutyl esters of carboxylic acids, which comprises reacting a mixture of an aromatic carboxylic acid, phosphorus trichloride and tetrahydrofuran in the presence of zinc chloride as catalyst.

4. Process for the production of chlorobutyl esters of carboxylic acids, which comprises reacting a mixture of a carboxylic acid, phosphorus trichloride and tetrahydrofuran at reflux temperature in the presence of zinc chloride as catalyst.

5. Process for the production of chlorobutyl esters of carboxylic acids, which comprises reacting a mixture of an aliphatic carboxylic acid, phosphorus trichloride and tetrahydrofuran at reflux temperature in the presence of zinc chloride as catalyst.

6. Process for the production of chlorobutyl esters of carboxylic acids, which comprises reacting a mixture of an aromatic carboxylic acid, phosphorus trichloride and tetrahydrofuran at reflux temperatures in the presence of zinc chloride as catalyst.

7. Process for the production of chlorobutyl acetate, which comprises reacting a mixture of acetic acid, phosphorus trichloride and tetrahydrofuran at reflux temperature in the presence of zinc chloride as catalyst.

8. Process for the production of chlorobutyl acetate, which comprises reacting a mixture of from 1 to 2 mols of acetic acid, from 0.3 to 0.75 mol of phosphorus trichloride and a mol of tetrahydrofuran at reflux temperature in the presence of from 0.0001 to 0.001 mol of zinc chloride as catalyst.

SAMUEL B. McFARLANE.
JOHN LOMARTIRE.

REFERENCES CITED

The following references are of record in the file of this patent:

UNITED STATES PATENTS

| Number | Name | Date |
|---|---|---|
| 2,314,454 | Manchen | Mar. 23, 1943 |
| 2,424,184 | Morell | July 15, 1947 |

OTHER REFERENCES

Paul, Compt. Rend., vol. 208, pages 587–589 (1939).

Smorgonskii, Chem. Abst., vol. 35, page 4011 (1941).